United States Patent [19]

Carlson

[11] 4,020,870

[45] May 3, 1977

[54] CONVERTIBLE GAS VALVE STRUCTURE

[75] Inventor: Everett W. Carlson, Detroit, Mich.

[73] Assignee: Lincoln Brass Works, Inc., Detroit, Mich.

[22] Filed: Mar. 26, 1976

[21] Appl. No.: 670,754

[52] U.S. Cl. .................... 137/625.3; 137/625.32
[51] Int. Cl.² ................................. F16K 11/083
[58] Field of Search .............. 251/207; 137/625.32, 137/625.3

[56] References Cited

UNITED STATES PATENTS 2,855,955  10/1958  Lamar ..................... 137/625.32 X Primary Examiner—Arnold Rosenthal Attorney, Agent, or Firm—Barnes, Kisselle, Raisch & Choate

[57] ABSTRACT

Rotatable valve plug in a gas valve has two circumferentially spaced recesses in its exterior registrable with the inlet in the valve body. Two axially spaced pairs of relatively small ports extend from the recesses to the internal gasway in the plug through which gas flows to the valve outlet. One port of each pair opens into each recess. Both recesses register with the inlet in intermediate on position of the valve, and only one recess registers with the inlet in low position. A screw threaded into a hollow operating stem on the plug is turnable to close and open selectively the inner ends of one pair of ports to convert the valve optionally for use with natural gas or LP gas.

15 Claims, 9 Drawing Figures

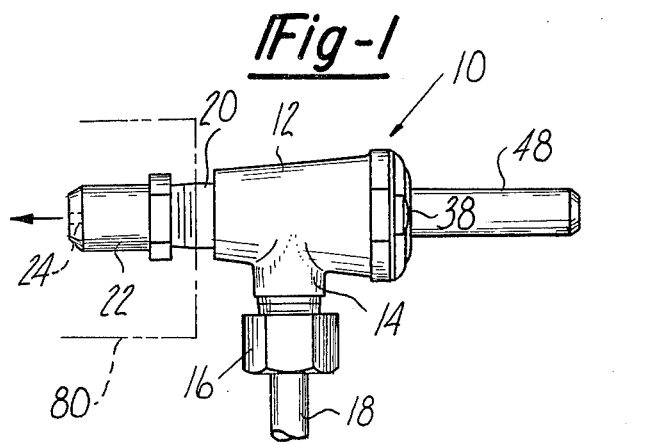
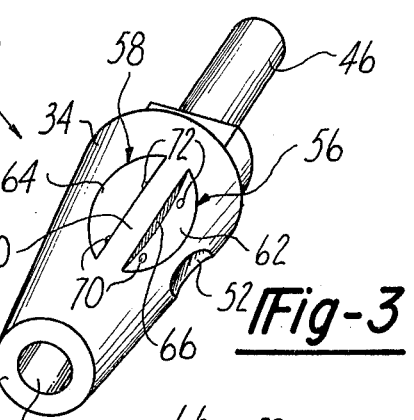
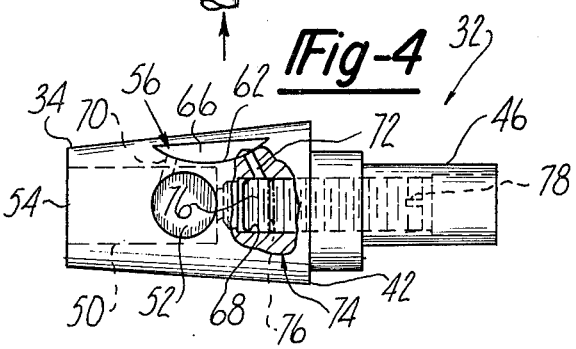
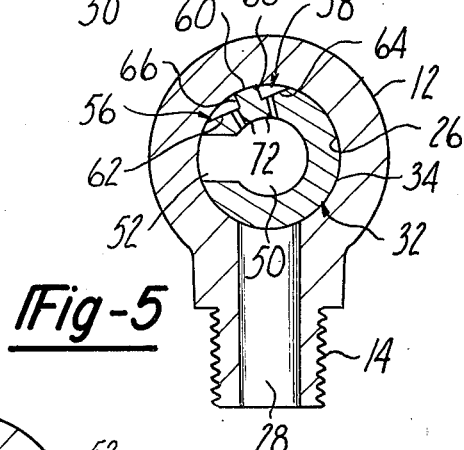
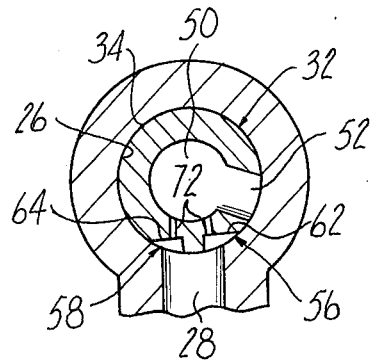
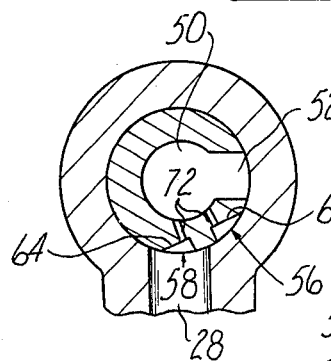
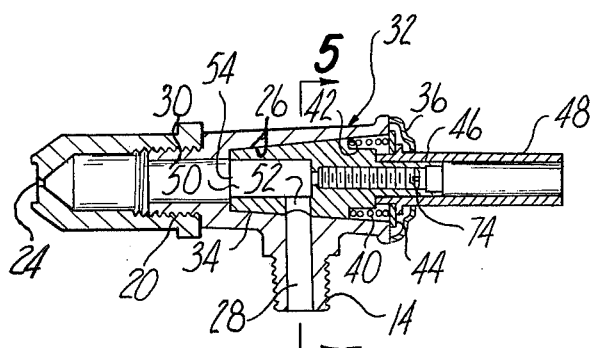
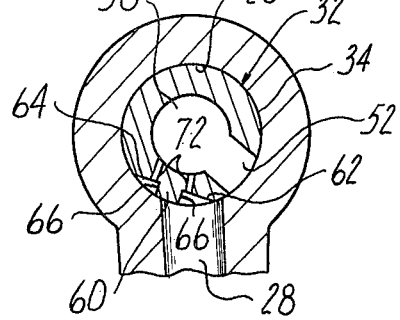

CONVERTIBLE GAS VALVE STRUCTURE

This invention relates generally to gas valves of the type used in domestic equipment such as gas ranges and outdoor grills which typically have high, intermediate and low on positions for furnishing gas to a burner at different rates. More particularly, the invention relates to such a valve which is convertible selectively for use with natural or LP (liquid petroleum) gas.

Under standard operating conditions, LP gas has about 2,500 BTU per cubic foot, while natural gas has about 1,000 BTU per cubic foot. In high or full on position of a conventional gas valve, the rate at which gas issues from the valve is controlled by the size of the orifice at the valve outlet, and this size is fixed by selection of a proper outlet hood threaded onto the outlet nipple of the valve body. Since the nipple is at the exterior of the valve and the hood costs but a few cents, little cost, time or inconvenience is involved in selecting and installing a hood having an outer orifice diametered for one or the other of LP or natural gas.

However, conventional valves have internal porting to provide gas at the intermediate and low flow rates and such porting is tailored for use exclusively with one type of gas or the other. The merchandizer of gas burning equipment frequently has no way of knowing whether the equipment will be used by the consumer with LP gas or natural gas; and, therefore, the merchandizer must provide two separate valves with the equipment, one for each type of gas, to facilitate correct installation of the equipment. The cost of the extra valve is borne by the consumer.

The object of the present invention is to provide a relatively simple, inexpensive single gas valve structure which is improved to be conditioned for use with either LP or natural gas by means of a simple, quick and convenient adjustment. One form of the invention is shown in the accompanying drawings in which:

FIG. 1 is a side elevational view of a valve according to the invention.

FIG. 2 is a longitudinal sectional view of the valve shown in FIG. 1.

FIG. 3 is an enlarged perspective view of the valve plug shown separately.

FIG. 4 is a side elevational view of the plug with parts broken away and shown in section to illustrate structural detail.

FIG. 5 is an enlarged scale generally sectional view on line 5—5 of FIG. 2, showing the valve in off position.

FIGS. 6–9 are views similar to FIG. 5 but showing the valve successively in high position, a transition position, intermediate position and low position.

Shown in the drawings is a valve 10 according to the present invention having a body 12 with an inlet nipple 14 threaded to receive a fitting 16 on a gas line 18 and having an outlet nipple 20 threaded to receive a hood 22 containing an outlet orifice 24. Body 12 has a hollow interior defined in part by an internal tapered surface 26 through which an inlet passageway 28 in nipple 14 opens, and the body has an outlet passageway 30 extending from the hollow interior of body 12 through nipple 20. A valve plug 32 within body 12 has a tapered exterior surface 34 which fits rotatably against body surface 26. Plug 32 is contained within the valve body by a cap 36 secured to the valve body by such means as screws 38. Surfaces 26, 34 are urged toward sealing interengagement by a coil spring 40 compressed between a shoulder 42 on plug 32 and a washer 44 retained on body 12 by cap 36.

Plug 32 has a hollow axial extension 46 around which is fitted a sleeve 48, extension 46 and the sleeve cooperating to form an operating stem for turning plug 32 within the valve body. Plug 32 has an axially extending internal gasway 50 and a relatively large diameter inlet port 52 extending between exterior surface 34 of the plug and gasway 50. Port 52 is positioned to be turned into registry with inlet passageway 28 in the high or full on position of valve 10 (FIG. 6) to admit fuel gas into gasway 50 from which it flows out of the downstream end 54 of gasway 50 and through outlet passageway 30. The structure thus far described is conventional.

In accordance with the invention, exterior surface 34 of plug 32 is provided with a pair of recesses 56, 58 which are spaced circumferentially from port 52 and which are spaced circumferentially from each other by a rib 60. In the form of the invention illustrated, recesses 56, 58 have respectively a bottom 62, 64 which is arcuately concave and which extends longitudinally of plug 32 through a distance adequate to span the diameter of inlet passageway 28. Rib 60 has sides 66 which are generally parallel to a longitudinal radial plane through plug 32 and which intersect surface 34 and bottoms 62, 64.

Gasway 50 has a portion 68 which extends axially away from port 52 and outlet 54 and which is internally threaded (FIG. 4) for a purpose to be described. A pair of relatively small diameter ports 70 open, one each at their outer ends, through recess bottoms 62, 64 and both open at their inner ends into gasway 50. A second pair of relatively small diameter ports 72 open, one each at their outer ends, through recess bottoms 62, 64 and both open at their inner ends into gasway extension 68. Ports 70 are angled somewhat toward outlet 54 in an inward direction (FIG. 4), and ports 72 are angled away from outlet 54 in an inward direction.

A screw 74 threaded into extension 68 has an end portion 76 which in advanced position of the screw closes the inner ends of ports 72, as shown in solid lines in FIG. 4, and which in the retracted position, shown in dotted lines, opens the inner ends of ports 72 for a purpose to be described. Screw 74 is shown as being provided with an end slot for reception of a screwdriver, or the like, for turning the screw.

In use it will be assumed that valve 10 is connected with a gas supply line 18, as shown in FIG. 1, and that a mixing tube, or the like, represented diagrammatically at 80, is positioned to receive gas issuing from outlet orifice 24 in hood 22; and that the valve is in the off position shown in FIG. 5 wherein inlet port 52 and recesses 56, 58 are out of registry with inlet passageway 28. To turn the valve to full on or high position, plug 32 is rotated counterclockwise, as the drawings are viewed, to the position of FIG. 6 wherein large port 52 registers with inlet passageway 28. Gas flows at a relatively high rate through large port 52, gasway 50, outlet passageway 30 and outlet orifice 24 into the mixing tube. In this position of the valve, the rate at which fuel gas enters mixing tube 80 is controlled by the size of outlet orifice 24.

To set the valve at intermediate position, valve plug 32 is turned further clockwise through the position of FIG. 7 to the position of FIG. 8 wherein large port 52 has moved out of registry with inlet passageway 28, and recesses 56, 58 become registered with the inlet passageway. In this position of the valve, gas flows from inlet 28 through recesses 56, 58, through ports 70 and into gasway 50 to issue through outlet orifice 24. If the valve is being used with natural gas, screw 74 has previously been retracted to the dotted line position of FIG. 4, and gas also flows from recesses 56, 58 through ports 72 into gasway 50 to issue through orifice 24. If, on the other hand, the valve is being used with LP gas, screw 74 will previously have been turned to advance it to the solid line position of FIG. 4, thereby closing the inner ends of ports 52 so that gas enters gasway 50 only through ports 70.

To set the valve at low position, plug 32 is rotated further counterclockwise to the position of FIG. 9 wherein recess 56 is out of registry with inlet 28, and only recess 58 is in registry with the inlet. Thus only one port 70 and one port 72 can receive gas from inlet 28. If the valve is being used with natural gas, screw 74 will previously have been retracted to the dotted line position of FIG. 4 wherein the inner ends of ports 72 are open, and gas will flow into gasway 50 through both the port 70 and the port 72 opening into recess 58. On the other hand, if the valve is being used with LP gas, screw 74 will previously have been advanced to the solid line position of FIG. 4 wherein the inner end of the port 72 which opens into recess 58 is closed, and gas will flow from recess 58 into gasway 50 only through a single port 70. From the low position of FIG. 9, the valve can be set at intermediate, high or off position by rotating valve plug 32 through the appropriate angle.

Ports 70 and ports 72 have each been referred to as a pair for convenience of description only. Neither ports 70 nor ports 72 need be of the same diameter. To the contrary, in a typical valve according to the invention, no two of these ports have the same diameter. These ports are given whatever diameters are required to provide the desired rates of gas flow therethrough singly and in combination. While screw 74 could be used to meter the flow of gas through the inner ends of ports 72, it is believed that the principal commercial use of valves 10 according to the invention will be simply to adjust the valve for use with LP or natural gas by completely closing or opening ports 72.

In typical valves according to the present invention, screw 74 is rotated through four complete turns to convert the valve from use with one kind of gas to the other. Usually, the assignee of the present invention, which manufactures such valves, ships them with screw 74 in the dotted line retracted position of FIG. 4 so that the valve is conditioned for use with natural gas. The valve is shipped with instructions that if it is to be used with LP gas, screw 74 should be turned inwardly through four turns. Thus the most that need be done to condition a valve 10 according to the invention for use with either LP or natural gas is to give screw 74 a few turns and select a hood 22 having a proper sized orifice 24 for threading onto outlet nipple 20.

I claim:

1. In a gas valve having a body with an inlet and an outlet and having a rotatable valve member provided with an internal gasway and porting which place said inlet and outlet in communication upon movement of said valve member from off position selectively to high, intermediate and low positions, improved structure wherein,
    said porting includes a relatively large diameter port registrable with said inlet in said high position,
    said porting also including first and second pairs of relatively small diameter ports, said pairs being spaced from each other axially of said valve member,
    the ports of each pair having outer ends which communicate with said inlet in said intermediate position,
    each pair having a single port which communicates with said inlet in said low position,
    the ports of each pair having an inner end which opens into said gasway,
    and means selectively operable to close and open said inner ends of said second pair of ports.

2. The structure defined in claim 1 wherein said valve member has an exterior surface rotatably engaged with an interior surface of said body, said exterior surface having two circumferentially spaced recesses registrable with said inlet and through which said small diameter ports so communicate with said inlet in said intermediate and low positions.

3. The structure defined in claim 2 wherein one port of each pair opens into each recess.

4. The structure defined in claim 3 wherein the locations at which said pairs of ports open into said recesses are spaced axially apart by a distance which exceeds the cross dimension of said inlet axially of said valve member.

5. The structure defined in claim 4 wherein each port of said first pair extends from said location thereof to said gasway in an angular direction toward said outlet, and each port of said second pair extends from said location thereof to said gasway in an angular direction away from said outlet.

6. The structure defined in claim 4 wherein said ports of each pair are circumferentially aligned with each other.

7. The structure defined in claim 2 wherein each recess has a bottom with an arcuate concave shape extending in a direction generally axial of said valve member, said pairs of ports having outer ends which open through said bottoms.

8. The structure defined in claim 7 wherein said recesses are separated circumferentially by a rib having sides which extend from said exterior surface to the bottoms of said recesses.

9. The structure defined in claim 8 wherein said sides extend substantially parallel to a longitudinal radial plane through said valve member.

10. The structure defined in claim 1 wherein said inner ends of the ports of said second pair are circumferentially aligned, and said means is operable to close and open the same substantially simultaneously.

11. The structure defined in claim 1 wherein said gasway has a portion extending away from said large port and said outlet into which said inner ends of the ports of the second pair open, said means comprising an element movable longitudinally in said portion of said gasway.

12. The structure defined in claim 11 wherein said element and portion of said gasway are threadedly interengaged.

13. The structure defined in claim 12 wherein said valve member has a hollow operating stem in extension of said gasway portion projecting to the exterior of said body through which said element is accessible for being turned.

14. The structure defined in claim 11 wherein said gasway has another portion extending toward said outlet into which said inner ends of the ports of said first pair open.

15. The structure defined in claim 5 wherein each recess has a bottom with an arcuate concave shape extending in a direction generally axial of said valve member, said pairs of ports having outer ends which open through said bottoms, said gasway having a portion which extends away from said large port and said outlet into which said inner ends of the ports of the second pair open, said means comprising an element threadedly interengaged with said portion of said gasway and being movable longitudinally in said gasway portion responsive to turning of said element.

* * * * *